Patented May 31, 1927.

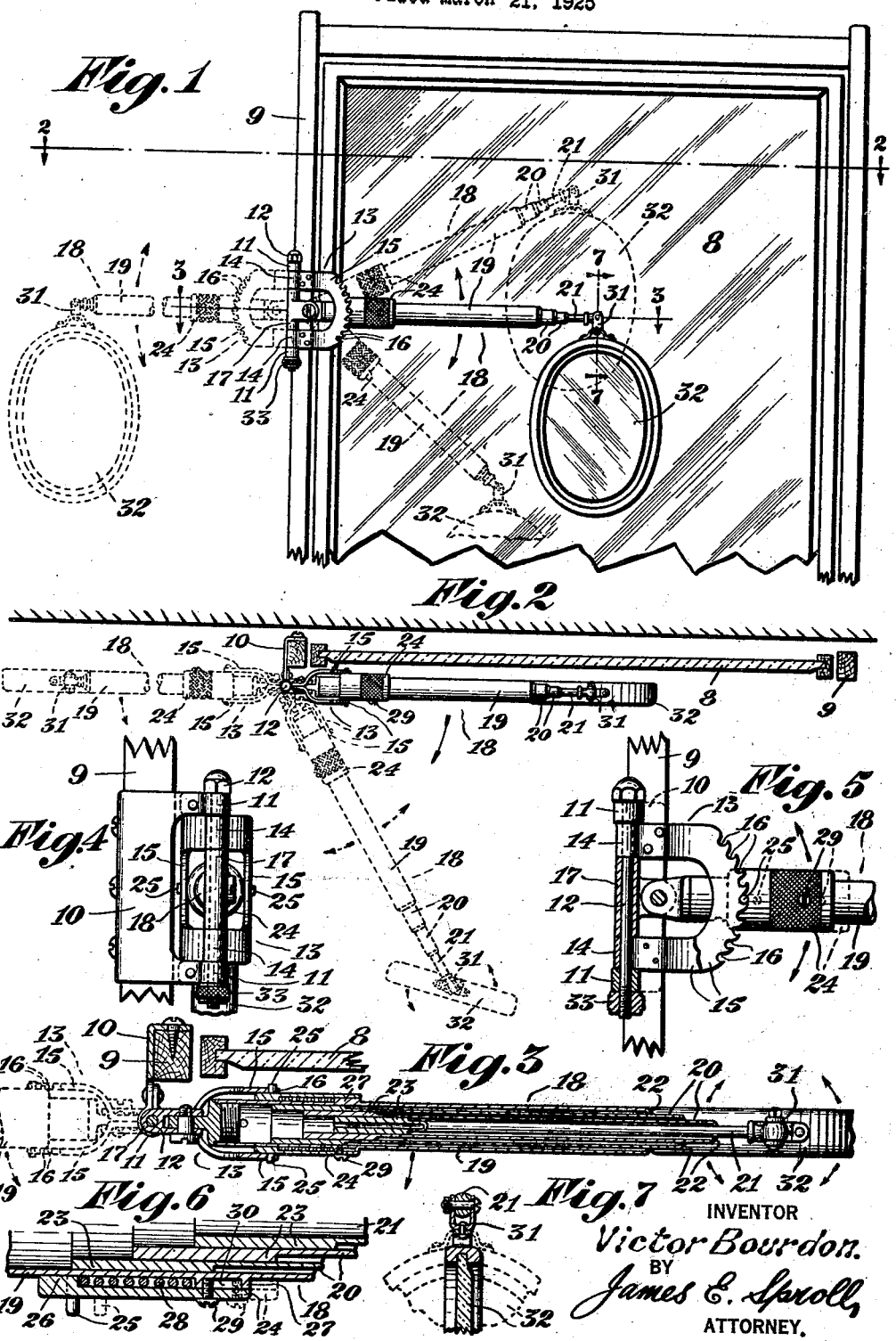

1,630,777

UNITED STATES PATENT OFFICE.

VICTOR BOURDON, OF SEATTLE, WASHINGTON.

ADJUSTABLE MIRROR BRACKET.

Application filed March 21, 1925. Serial No. 17,252.

This invention relates to improvements in adjustable mirror-brackets, having more particular reference to improvements in the adjustable mirror bracket disclosed and claimed in United States Letters Patent No. 1,129,960, issued March 2, 1915, to Andrew Conning and Victor Bourdon, of Seattle, Washington, and aims primarily to provide a more compact and simplified adjustable mirror-bracket structure embodying novel mechanism, whereby horizontal and vertical swinging movements or adjustments of the correlated mirror supporting arm thereof, relative to the fixed base of said structure may be more rapidly effected and expeditiously obtained than heretofore.

With these and other ends in view the invention essentially resides and is primarily concerned in the provision of a telescopic adjustable mirror-bracket designed to be attached to a large or main mirror, to thereby positively retain and maintain a small mobile mirror in any desired position relative thereto and in any selected angular position relative to the point of attachment of said mirror-bracket thereon, and in the preferred embodiment thereof is characterized by the employment of a fixed bifurcated base having a notched yoke member interconnected therewith for horizontal swinging movement relative thereto; a telescopic mirror supporting arm interconnected with said base in a novel manner for horizontal and vertical swinging movement relative thereto and embraced by said yoke member for vertical swinging movement relative thereto; a spring-pressed detent sleeve slidably mounted upon said mirror supporting arm designed to restrainingly engage said notched yoke member, whereby said arm is retained in selective vertically adjusted positions thereon; a mobile mirror pivotally and swivelly mounted upon the outer end of said telescopic arm, and in novel adjusting means to vary the friction between the said fixed bifurcated base and the correlated portions of the yoke member and mirror supporting arm interconnected therewith and interposed therebetween, whereby said yoke member and said mirror supporting arm are retained in any desired horizontal angular position relative to said fixed bifurcated base.

The invention further resides in the novel construction, combination, adaptation and arrangement of parts, as will hereinafter be more fully described and succinctly defined in the claims appended hereunto.

Referring now to the accompanying drawings wherein is illustrated the specific form of the invention, as at present preferred:—

Figure 1 is an elevation of a telescopic adjustable mirror bracket fabricated in accordance with the invention, as it would appear when operatively secured to the correlated large mirror thereof and disposed in spaced parallel relation thereto, dotted lines therein indicating certain selected adjusted positions of said mirror bracket relative to the point of attachment thereof.

Fig. 2 is a horizontal section taken through 2—2 of Fig. 1, dotted lines therein indicating certain horizontally adjusted positions of the mirror supporting arm relative to the point of attachment thereof.

Fig. 3 is a similar section taken through 3—3 of Fig. 1.

Fig. 4 is an end elevation of the adjustable mirror-bracket, as it would appear when swung inwardly.

Fig. 5 is an enlarged fragmentary elevation of the articulated end of the adjustable mirror-bracket, with certain parts broken away and certain other parts in section for clarity of illustration.

Fig. 6 is an enlarged fragmentary horizontal section of the spring-pressed detent sleeve of the telescopic mirror-supporting arm, and Fig. 7 is an enlarged fragmentary vertical section taken through 7—7 of Fig. 1 illustrating the pivotal and swivel mechanism interconnecting the mobile mirror with the correlated supporting arm thereof.

In the drawings similar reference characters designate similar parts throughout the several views.

The numeral 8 designates a large or main mirror, provided with a frame 9, to which is rigidly secured upon one of the uprights thereof a vertically disposed angularly shaped base member 10, of the adjustable mirror bracket, having the forward edge of the lateral flange or web thereof bifurcated and the bifurcated portions of said flange projecting forwardly from the frame 9, whereat said bifurcated portions are bent and secured upon themselves to form loops or eyes 11, through which a threaded hinge pin or bolt 12 extends.

Interposed between the eyes 11 and mounted upon the hinge pin 12 for horizontal swinging movement relative to the fixed base member 10 is a yoke member 13, which in the present instance is preferably fabricated from a single bar or strip of material bent and secured upon itself in the arcuate and curvilinear formation shown, to provide loops or eyes 14 upon the inner ends of the spaced legs thereof, to normally receive the hinge pin 12, and having the outer end thereof bifurcated or provided with arcuate jaws 15 having a series of notches 16 cut in the arcuate perimeters thereof.

Interposed between the eyes 14 of the yoke member 13 and mounted upon the hinge pin 12 for horizontal swinging movement relative to the fixed base member 10 is a universal joint or knuckle member 17, to which is pivotally connected, for horizontal and vertical swinging movement relative to the fixed base member 10, the inner end of a telescopic mirror supporting arm 18, which latter extends outwardly from said joint 17 and is embraced adjacent thereto by the arcuate jaws 15 of the yoke member 13.

The telescopic mirror supporting arm 18 comprises a plurality of telescopic tubular sections including an outer section or casing 19, intermediate telescopic sections 20 and an inner telescopic section 21. The several sections of the arm 18 are held against separation or disengagement by crimping the outer ends of the sections 19 and 20, as shown at 22 in Fig. 3, and providing the inner ends of the sections 20 and 21 with portions 23, of slightly larger diameter, the outer ends of which are designed to abut the crimped ends 22 of the sections 19 and 20, when the several telescopic sections of the arm 18 are fully extended, to prevent disengagement of said sections, as will be obvious and apparent. The enlarged portions 23 formed upon the inner ends of the sections 20 and 21, also function and serve as guides for said inner ends and maintain the latter in co-axial relation during telescopic movement of the same, as will be readily understood by referring to Fig. 3.

Slidably mounted upon the outer arm 19, of the telescopic arm 18 adjacent to the inner end thereof is a spring pressed sleeve 24 provided with outwardly directed detent pins 25 adapted to selectively seat within the notches 16, of the yoke member 13, to retain the arm 18 in selected vertically adjustable positions thereon, as shown more clearly in Fig. 5. The inner wall of the sleeve 24 at the inner end thereof is provided with a portion 26 of slightly reduced diameter for sliding engagement with the exterior wall of the outer section 19, and said exterior wall of the outer section 19, is provided adjacent thereto with a portion or shoulder 27 of slightly larger diameter upon which the inner wall of the sleeve 24 at the outer end thereof is mounted for sliding engagement therewith. Interposed between the portions 26 and 27 and housed within the sleeve 24 is a relatively light compression or helical spring 28, which functions and serves to maintain the detent pins 25, of said sleeve 24, in engagement with the selected and correlated notches 16, of the yoke member 13. Threadably engaged within the wall of the sleeve 24 adjacent the outer end thereof is a stop pin or screw 29 having the inner end thereof normally seated within a longitudinally disposed slot 30 formed within the periphery of the enlarged or guide portion 27 of the outer section 19, to thereby limit the axial or sliding movement of the sleeve 24 thereon, as will be readily apparent by referring to Fig. 6.

Pivotally connected to the outer terminal of the inner telescopic section 21 of the arm 18, is a clevis 31 and swivelly mounted upon the lower end of the latter is a small mobile mirror 32, whereby the axis of the mirror will always be disposed in a vertical plane as shown in dotted lines in Fig. 1 and rotated upon the axis thereof to any desired angle in a horizontal plane, as shown in dotted lines in Figs. 2 and 7, regardless of the angular position assumed by the arm 18.

To vary the friction between the fixed bifurcated base member 10 and the interposed portions of the yoke member 13 and universal joint 17 mounted upon the hinge pin 12, an adjusting nut 33 is threadably mounted upon the lower projecting threaded end of said pin and is tightened thereon, to thereby frictionally maintain and retain the yoke member 13 and the telescopic mirror supporting arm 18 in a selected or desired angular position in a horizontal plane, as indicated in dotted lines in Fig. 2. It will therefore be obvious and apparent that should the frame 9 of the mirror 8, be out of plumb the frictional engagement secured by the adjusting nut 33 between the fixed base 10 and the correlated yoke member 13 and universal joint 17 thereof will function and serve to maintain or retain said member 13 and joint 17 in the angular position aforesaid.

Manifestly therefore, in the construction herein shown and described the small mobile mirror 32 is supported for horizontal and vertical swinging movement relative to the fixed base 10, for movement toward and away from said base, and for rotative or swivel movement of said mirror relative to the correlative supporting arm thereof whereby any desired position or degree of adjustment may be secured for the small mobile mirror 32 relative to its associated large mirror 8, or the said small mobile mirror 32 may be swung to an inoperative position relative to the mirror 8, as indicated in dotted lines Figs. 1, 2 and 3.

In the accompanying drawings I have illustrated the adjustable mirror bracket of the invention, as adjustably secured to the left-hand upright of the mirror frame 9, but I desire to have it understood that said bracket may be mounted upon the right-hand upright of said mirror frame, by reversing the fixed base 10, and will function with equal and uniform efficiency thereat, as in the manner disclosed and described.

By employing the spring-pressed detent sleeve 25 vertical adjustment of the arm 18 relative to the yoke member 13 is more readily and rapidly effected and a much more compact and simplified structure is provided, than heretofore. It will be observed by referring to the accompanying drawings that the present structure is so fabricated that assembly of the several parts thereof may be expeditiously performed and the bracket readily attached to or detached from the correlated frame 9 thereof and when desired the dismantling of the structure may be similarly performed.

While I have herein shown and described the invention with sufficient detail to enable those skilled in the art to understand the mode of construction and the principles involved, it is to be understood that there is no intentional limitation herein to the specific form and precise details of construction of the invention shown and described, except as expressly defined by the appended claims, and that various modifications of said construction may be resorted to without departing from the invention or the benefits derivable therefrom. I also desire it to be understood that certain features of the invention herein shown and described may be employed in other combinations than those herein shown.

Having thus fully described my invention, what I claim as new and desire to secure by Letters Patent of the United States of America is:—

1. In an adjustable mirror-bracket, in combination, a fixed base, a vertically disposed hinge pin mounted therein, a yoke member mounted upon said hinge pin for horizontal swinging movement only relative to said base, a knuckle member mounted upon said hinge pin midway the length thereof for horizontal swinging movement only relative to said base, a mirror supporting arm pivotally connected to said knuckle member midway the length thereof and embraced by said yoke member for vertical swinging movement relative to said members and horizontal swinging movement therewith, and means for retaining the arm in selective vertically adjustable positions upon said yoke member.

2. In an adjustable mirror-bracket, in combination, a fixed base, a vertically disposed hinge pin mounted therein, a notched yoke member mounted upon said hinge pin for horizontal swinging movement only relative to said base, a knuckle member mounted upon said hinge pin midway the length thereof for horizontal swinging movement only relative to said base, a telescopic mirror supporting arm pivotally connected to said knuckle member midway the length thereof and embraced by said notched yoke member for vertical swinging movement relative to said members and horizontal swinging movement therewith, and means slidably disposed upon said arm restrainingly engaging said notched yoke member for retaining the arm in selective vertically adjustable positions thereon.

3. In an adjustable mirror-bracket, in combination, a fixed base, a vertically disposed hinge pin mounted therein, a bifurcated arcuate yoke member mounted upon said hinge pin for horizontal swinging movement relative to said base and having a series of notches formed in the arcuate perimeter thereof, a knuckle member mounted upon said hinge pin for horizontal swinging movement relative to said base, a telescopic mirror supporting arm pivotally connected to said knuckle member and embraced by said yoke member for vertical swinging movement relative to said members and horizontal swinging movement therewith, and a spring-pressed sleeve slidably disposed upon said arm and restrainingly engaging said notched yoke member for retaining the arm in selective vertically adjustable positions thereon.

4. In an adjustable mirror-bracket, in combination, a fixed bifurcated angular base having forwardly extending looped bifurcated portions, a vertically disposed hinge pin mounted within said looped portions, a bifurcated arcuate yoke member interposed between said looped portions having spaced looped inner ends mounted upon said hinge pin for horizontal swinging movement relative to said base and having a series of notches formed in the arcuate perimeter thereof, a knuckle member interposed between said spaced looped inner ends and mounted upon the hinge pin for horizontal swinging movement relative to said base, an adjustable telescopic mirror supporting arm pivotally connected to said knuckle member and embraced by said yoke member for vertical swinging movement relative to said members and horizontal swinging movement therewith, and a spring-pressed detent sleeve slidably disposed upon said arm and restrainingly engaging said notched yoke member for retaining the arm in selective vertically adjustable positions thereon.

In testimony whereof I affix my signature.

VICTOR BOURDON.